US009764403B2

(12) United States Patent
Bayer et al.

(10) Patent No.: US 9,764,403 B2
(45) Date of Patent: Sep. 19, 2017

(54) METHOD AND ELECTRODE FOR ELECTROCHEMICALLY PROCESSING A WORKPIECE

(75) Inventors: Erwin Bayer, Dachau (DE); Roland Huttner, Jesenwang (DE)

(73) Assignee: MTU Aero Engines GmbH, Munich (DE)

( * ) Notice: Subject to any disclaimer, the term of this patent is extended or adjusted under 35 U.S.C. 154(b) by 717 days.

(21) Appl. No.: 13/639,674

(22) PCT Filed: Apr. 6, 2011

(86) PCT No.: PCT/DE2011/000363
§ 371 (c)(1),
(2), (4) Date: Nov. 13, 2012

(87) PCT Pub. No.: WO2011/124208
PCT Pub. Date: Oct. 13, 2011

(65) Prior Publication Data
US 2013/0056365 A1     Mar. 7, 2013

(30) Foreign Application Priority Data
Apr. 8, 2010  (DE) .................. 10 2010 014 242

(51) Int. Cl.
*B23H 3/04*     (2006.01)
*B23H 3/10*     (2006.01)

(52) U.S. Cl.
CPC ............ *B23H 3/04* (2013.01); *B23H 3/10* (2013.01)

(58) Field of Classification Search
CPC .................. B23H 3/00–3/10; C25F 3/00–3/30
USPC ............................................. 205/640–686
See application file for complete search history.

(56) References Cited

U.S. PATENT DOCUMENTS

| 3,041,265 A | 6/1962 | Williams |
| 3,271,281 A * | 9/1966 | Brown et al. ............... 205/640 |
| 3,305,470 A | 2/1967 | Williams et al. |
| 3,372,099 A | 3/1968 | Clifford |
| 3,433,727 A | 3/1969 | Keeleric |

(Continued)

FOREIGN PATENT DOCUMENTS

| AT | 209 131 | 5/1960 |
| CA | 1245728 | 11/1988 |

(Continued)

OTHER PUBLICATIONS

Wang et al., Electrochemical Drilling with Vacuum Extraction of Electrolyte, J. of Materials Processing Tech. 210, 238-244 (2010).*

(Continued)

*Primary Examiner* — James Lin
*Assistant Examiner* — Ho-Sung Chung
(74) *Attorney, Agent, or Firm* — Davidson, Davidson & Kappel, LLC

(57) ABSTRACT

A method for electrochemically processing a workpiece surface using an electrode, which has at least one effective surface for processing the workpiece surface, and using an electrolyte, wherein the electrolyte is suctioned away from the effective surface. The invention further relates to an electrode, which has at least one electrolyte feed for supplying the electrolyte to the effective area and an electrolyte suctioning system for suctioning the electrolyte away from the effective area.

9 Claims, 2 Drawing Sheets

(56) References Cited

U.S. PATENT DOCUMENTS

| | | | |
|---|---|---|---|
| 6,835,299 B1 * | 12/2004 | Tchugunov | 205/654 |
| 7,575,667 B2 | 8/2009 | Bayer et al. | |
| 7,964,086 B2 | 6/2011 | Bayer et al. | |
| 8,273,238 B2 | 9/2012 | Ziegler et al. | |
| 2006/0070887 A1 * | 4/2006 | Zdeblick et al. | 205/652 |
| 2007/0256938 A1 * | 11/2007 | Fruth | 205/668 |

FOREIGN PATENT DOCUMENTS

| | | |
|---|---|---|
| DE | 565765 | 12/1932 |
| DE | 1274415 | 8/1968 |
| DE | 1515195 | 12/1971 |
| DE | 3490750 | 8/1986 |
| DE | 102 37 324 B4 | 8/2003 |
| DE | 10 2004040216 | 12/2005 |
| DE | 10 2004 040 217 | 3/2006 |
| DE | 102005027844 | 12/2006 |
| DE | 10 2007 023 494 | 11/2008 |
| FR | 1.437.641 * | 3/1966 |
| FR | 1 437 641 | 5/1966 |
| GB | 335003 | 9/1930 |
| WO | WO 00/56513 A1 | 9/2000 |
| WO | WO 2010/136009 A1 | 12/2010 |

OTHER PUBLICATIONS

Linden, FR 1.437.641 (filed Mar. 25, 1965), Machine Translation.*
Linden, FR 1.437.641, Partial Human Translation (1965).*
The Machine Co.:"Outillage pout l'usinage electrochimique", machine modern, machine modern, Paris, FR, Nov. 1, 1969, pp. 51-56, see English translation submitted herewith (18 pages).

* cited by examiner

METHOD AND ELECTRODE FOR ELECTROCHEMICALLY PROCESSING A WORKPIECE

The present invention relates to a method for electrochemically machining a workpiece, and to an electrode for carrying out such a method.

BACKGROUND

Electrochemical machining (ECM) and pulsed electrochemical machining (PECM) make it possible to machine workpiece surfaces very precisely and without stress to the material. In this process, a potential differential is built up between a workpiece that serves as the anode and an electrode that serves as the cathode or tool and that is positioned across from the workpiece area that is to be machined, after which material is removed from the workpiece via an electrolyte, for example, a saline solution. Since the electrode usually replicates the desired contour of the workpiece surfaces that are to be machined, the workpiece area can be machined virtually in one step.

Electrochemical machining can be traced back to a Russian development and was already patented back in 1929 at the German Reich Patent Office under number DE 565765. The main difference between the ECM method and the PECM method is that with the PECM method, the electrode executes a pulsed motion in the advancing direction, so that a narrow machining gap filled with the electrolyte is opened or enlarged between the electrode and the workpiece, as a result of which the spent electrolyte can drain away more easily.

A problematic aspect encountered in electrochemical machining, however, is the control of the electrolyte flow. This is why German patent application DE 1515195 A1 proposes an electrode consisting of a plurality of partial electrodes that are electrically insulated from each other and that are actuated or activated as a function of a relative position between the electrode and the workpiece.

By the same token, German patent application DE 10 2007 023 494 A1, particularly in order to form fluid bearings, discloses the approach of providing electric insulation on the surfaces areas of an electrode from which no material is to be removed.

German patent application DE 10 2004 040 217 A1 of the applicant describes an ECM/PECM method for forming a cavity in a workpiece. The workpiece is placed in an electrolyte immersion bath and an energized electrode is sunk into the workpiece. However, it has been found that the resultant side surfaces of the cavity created in the workpiece, that is to say, the workpiece surfaces that are parallel to the advancing direction or the workpiece surfaces that delimit a side gap with the electrode, are formed with inferior surface quality than a bottom surface of the cavity in the workpiece, which requires subsequent machining of the side surfaces of the workpiece, as a result of which disturbances can occur in the transition area leading to the bottom surface of the workpiece.

Even though electrodes with retractable partial electrodes are known, their mechanical implementation is very complicated. It is also a known procedure to machine the cavity in two stages, so that the bottom surface is machined first, and then the side surfaces of the cavity. In this process, the side surfaces are sunk with a special electrode that is moved as orthogonally as possible with respect to the side surfaces. A drawback of this known variant is especially the fact that it has to be carried out with a double set of electrodes and that, when the side surfaces are sunk, a certain amount of etching can occur in the area of the bottom surface.

SUMMARY OF THE INVENTION

It is an object of the present invention to provide a method and an electrode that overcome the above-mentioned drawbacks and that allow a systematic control of the electrolyte flow and thus a localized activation of individual areas of the electrode surfaces.

The present invention provides a method for electrochemically machining a workpiece with an electrode that has at least one active surface for sinking a workpiece surface and with an electrolyte is characterized in that the electrolyte is suctioned off the active surface. As a result, the electrolyte flow is restricted only to the active surface or to the active area of the electrode that is actually needed, so that workpiece material is removed only there. The surface areas of the electrode adjacent to the active surface are and remain dry, so that, for example, no removal or caustic attack occur in the side gap when a workpiece surface is sunk. The electrolyte flow is systematically controlled via the active surface, and individual electrode surface areas are activated locally. Furthermore, the suctioning allows an economical use of the electrolytes since there is no a need for an immersion bath nor does the spent electrolyte drain away in an uncontrolled manner.

Preferably, the electrolyte is fed in at the center of the active surface and suctioned off at the edge area of the active surface. In this embodiment, the electrolyte suctioning means virtually surrounds the electrolyte feed means, as a result of which any accidental activation of adjacent electrolyte surfaces is effectively prevented. Depending on the size of the active surface, it can be advantageous to carry out an additional suctioning procedure in the center area.

In one embodiment, the electrolyte passes through the electrode all the way to the active surface and is then suctioned off the active surface through the electrode. This creates an electrolyte circuit in the electrode, thus allowing a very compact construction of the technical device.

In a method for forming a cavity, the electrode is positioned across from a workpiece surface that is to be machined. The active surface is then defined by switching on the electrolyte circuit comprising an electrolyte feed means and an electrolyte suctioning means. Subsequently, a cathode voltage is applied and the electrode is moved in the advancing direction until the workpiece surface has been machined to its desired contour. Then the cathode voltage is switched off, the advancing movement is halted and the electrolyte flow is interrupted. The electrolyte suctioning means is switched off as soon as the machined workpiece surface is dry. Then the above-mentioned steps are repeated until all of the workpiece surfaces to be machined such as, for instance, the side surfaces of the cavity, have been machined, whereby the advancing direction and the active surface change as a function of the workpiece surfaces that are to be machined. This multi-axial method is especially well-suited for shaping the cavity with an undercut or for shaping workpiece surfaces that are at some other angle relative to each other. In particular, with this method, the entire electrode, in other words, all of the potential active areas, can be energized at all times since the electrolyte is only fed to the active area that is needed at a given moment and it is then suctioned off the active area, at least in the edge area, so that the adjacent potential active surfaces are dry and no material is removed by them.

An electrode according to the invention and intended for electrochemically machining a workpiece has at least one active surface. According to the invention, at least one electrolyte feed means for feeding electrolytes to the active surface and one electrolyte suctioning means for suctioning the electrolyte off the active surface are configured in the electrode. In particular, the electrode according to the invention allows the systematic localized activation of individual active surfaces, so that it is suitable especially for electrochemical methods such as the formation of a cavity having precise bottom and side surfaces. The solution according to the invention makes it possible to dispense with known measures such as protective currents, passivation or selective caustic attack. Consequently, the resources needed in terms of equipment and control technology are very limited; in particular, the entire electrode can be energized at all times since the electrolyte is systematically fed to the active surface and then suctioned off it, so that adjacent areas of the electrode are or remain dry.

In one embodiment, the electrolyte feed means and the electrolyte suctioning means comprise a plurality of channels that exit from the active surface in the form of a pattern of perforations. The channels can be created, for instance, mechanically by means of a drill, although it is also conceivable to create the entire electrode by means of a generative manufacturing process.

In order to also increase the replication precision, however, the active surface can have a porous surface structure that is in fluid communication with the channels.

The electrode can be assembled like a module out of a plurality of segments that each have at least one active surface. As a result, the electrodes can be manufactured with any desired geometry and dimensions easily and inexpensively.

The segments can be electrically insulated from each other by means of an insulating layer, so that even in the unlikely eventuality that the electrolyte drains into non-activated surface areas of the electrode adjacent to the active surface, removal or caustic attack in this area is effectively prevented.

Further advantageous embodiments of the present invention are the subject matter of additional subordinated claims.

BRIEF DESCRIPTION OF THE DRAWINGS

An embodiment of the invention will be described in greater detail below making reference to the schematic drawings. The following is shown.

DETAILED DESCRIPTION

Figure 1:
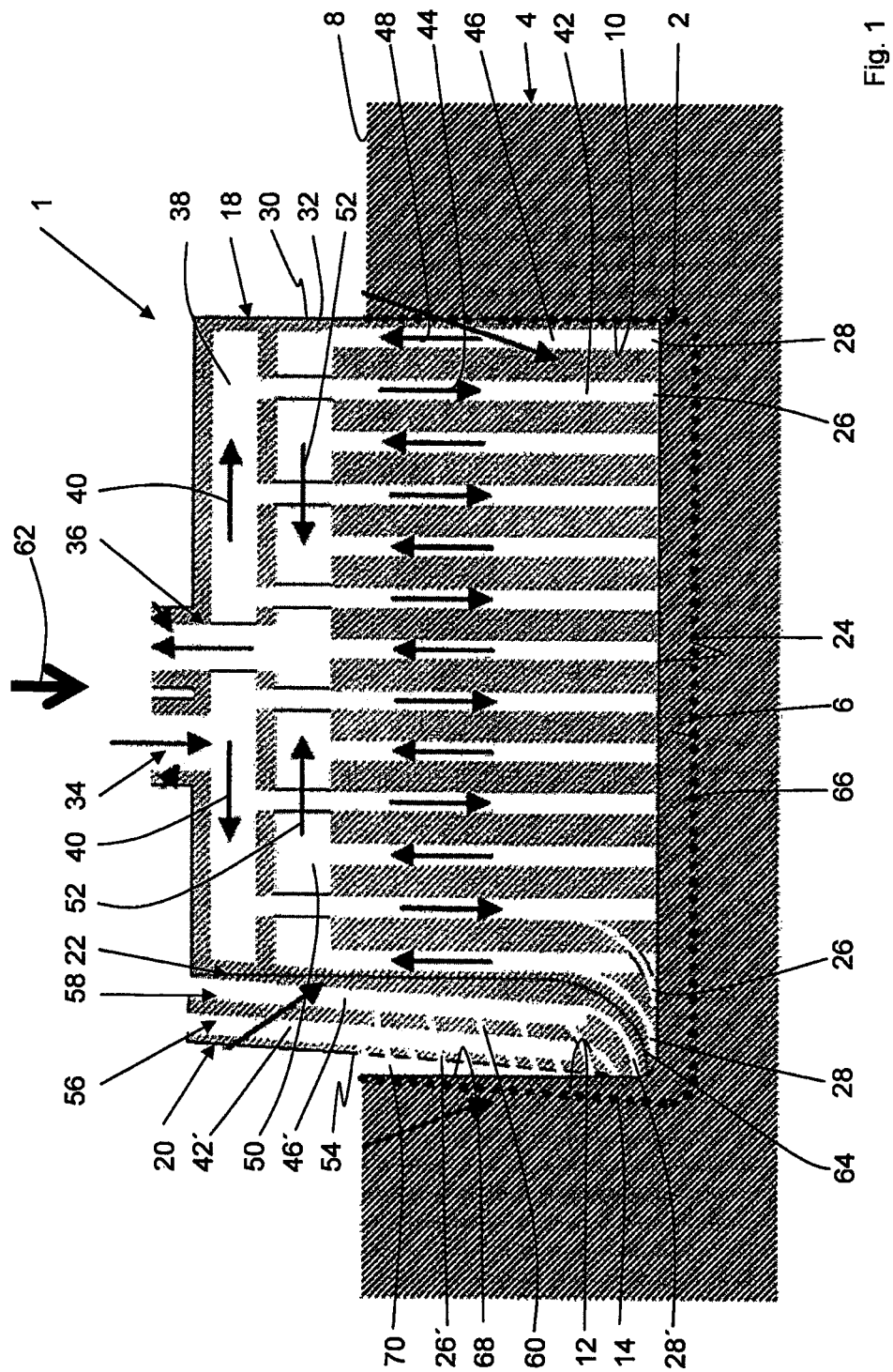
FIG. 1: a cross section through an electrode according to the invention, and a first method step for creating a cavity.

In the figures, the same structural elements bear the same reference numerals whereby, for the sake of clarity, if there are several of the same structural elements in one figure, only a few of them are provided with a reference numeral.

FIG. 1 shows a cross section through an electrode 1 according to the invention, for purposes of creating a cavity 2 in a workpiece 4.

The cavity 2 that is to be created is indicated by the dotted line and, in its cross section, it should have a bottom surface 6 which, in this embodiment, runs parallel to the surface 8 of the workpiece 4, a side surface 10 which extends at a right angle between the bottom surface 6 and the top surface 8, as well as a side surface 12 situated on the opposite side, which is arranged with respect to the bottom surface 6 and the top surface 8 in such a way that an undercut 14 is formed.

The electrode 1 has an electrode element that, like a module, consists of a base segment 18 and a side segment 20, which are electrically insulated from each other by means of an insulating layer 22.

The base segment 18 has a front surface 24 that can be activated as the active surface and that serves to form the bottom surface 6 which has a plurality of first outlet openings 26 and first inlet openings 28 for an electrolyte. In the embodiment shown, the first outlet and inlet openings 26, 28 form a pattern of perforations and they are arranged alternately next to each other, whereby the first inlet openings 28 can be arranged in the center and edge areas of the front surface 24, while the first outlet openings 26 can be arranged only in the center area, so that, in a view onto the front surface 24, the first inlet openings 28 in the edge area surround at least the first outlet openings 26 in the center area. In order to form the side surfaces 10 that run at a right angle, the base segment 18 has a lateral surface 30 that extends at a right angle to the front surface 24 and that is formed by a closed wall 32.

An electrolyte feed means 34 and an electrolyte suctioning means 36 are integrated into the base segment 18 for purposes of forming an electrolyte circuit. Relative to the figure sheet viewed crosswise, the electrolyte feed means 34 has a horizontal feed channel 38 that serves to distribute the electrolyte in the crosswise or widthwise direction of the base segment 18 (direction of flow indicated by the arrows 40) that is in fluid communication with a plurality of first vertical feed channels 42 (the appertaining direction of flow indicated by the arrow 44). The first vertical feed channels 42 open into the first outlet openings 26 of the front surface 24. The electrolyte suctioning means 36 has a plurality of first vertical suctioning channels 46 (the appertaining direction of flow indicated by the arrow 48) that are open towards the front surface 24 via the first inlet openings 28 and that are in fluid communication with a horizontal suctioning channel 50 (direction of flow indicated by the arrows 52).

For purposes of forming the upright side surface 12 or for purposes of forming the undercut 14, the side segment 20 has an active surface or a slanted surface 54 which can be activated and in which a pattern of perforations consisting of a plurality of second outlet openings 26' is formed. Second inlet openings 28' are formed in the edge area of the slanted surface 54 and thus in the area where the slanted surface 54 makes a transition to the front surface 24. The side segment 20 has an integral electrolyte feed means 56 and an integral electrolyte suctioning means 58 that can be actuated independently of the electrolyte feed means 34 and of the electrolyte suctioning means 36 of the base segment 18. The electrolyte feed means 56 as well as the electrolyte suctioning means 58 each have at least one second feed channel 42' that runs approximately vertically as well as a second suctioning channel 46' that, on the one hand, are in fluid communication with the second inlet openings 26' or the outlet openings 28' for purposes of feeding the electrolyte to the slanted surface 54 or of suctioning it off the slanted surface 54 and, on the other hand, they are in fluid communication with each other via a plurality of perforations 60.

The insulating layer 22 extends essentially in the vertical direction 62 of the electrode 1 and has a curved section 64 that opens into the transition area at the edge. The curved section 64 and a correspondingly curved layout of the first feed channels 42 and of the suctioning channels 46 in the vicinity of the transition area allow the formation of the bottom surface 6 exclusively by means of the front surface 24 of the base segment 18. Since the suctioning according to the invention takes place at least in the edge area of the slanted surface 54 and of the front surface 24, preferably only first and second inlet openings 28, 28' or suctioning channels 46 are arranged in the transition area and they are insulated from each other by the insulating layer 22.

A biaxial method for actuating the electrode 1 for purpose of forming the cavity 2 will be explained below. First of all, the electrode 1 is positioned across from the workpiece 4 in the area of the surface 8 that is to be machined. Then the electrolyte circuit of the base segment 18 is switched on. The electrolyte is fed via the electrolyte feed means 34 through the base segment 18 and then exits from the first outlet openings 42 in the area of the front surface 24. The electrolyte is subsequently suctioned off the front surface 24 or the active surface via the first inlet openings 46, and returned through the base segment in this process. Then a cathode voltage is applied and the electrode 1 is moved in the vertical direction 62, so that the surface 8 is sunk until sufficient material 66 has been removed and the bottom surface 6 has been formed. Due to the suctioning of the electrolyte in the edge area of the front surface 54, the lateral surface 30 remains dry, so that, in spite of the fact that the lateral surface 30 is energized, it does not function as an active surface. The side surface 10 is formed directly by or during the sinking of the surface 8, whereby, despite the fact that the lateral surface 30 slides along the side surface 10, disturbances of the side surface 10 are prevented by the suctioning of the electrolytes in the edge area of the front surface 24, or else in the edge area where the front surface 24 makes a transition to the lateral surface 30. In contrast to this, due to the positioning of the slanted surface 54, a wedge-shaped side gap 70 is formed between the slanted surface 54 and an opposite side workpiece surface 68, so that the entire surface of the slanted surface 54 is at a distance from the workpiece surface 68 when the surface 8 is sunk. In spite of this, due to the edge suctioning, the slanted surface 54 remains dry in the area of the front surface 24. As soon as the bottom surface 6 has been formed, the cathode voltage is switched off, the advancing movement in the vertical direction 62 is halted, and subsequently the electrolyte flow 34 is blocked. The electrolyte suctioning means 36 is only switched off once the bottom surface 6 has dried sufficiently so that further material removal or a caustic attack is prevented.

Figure 2:
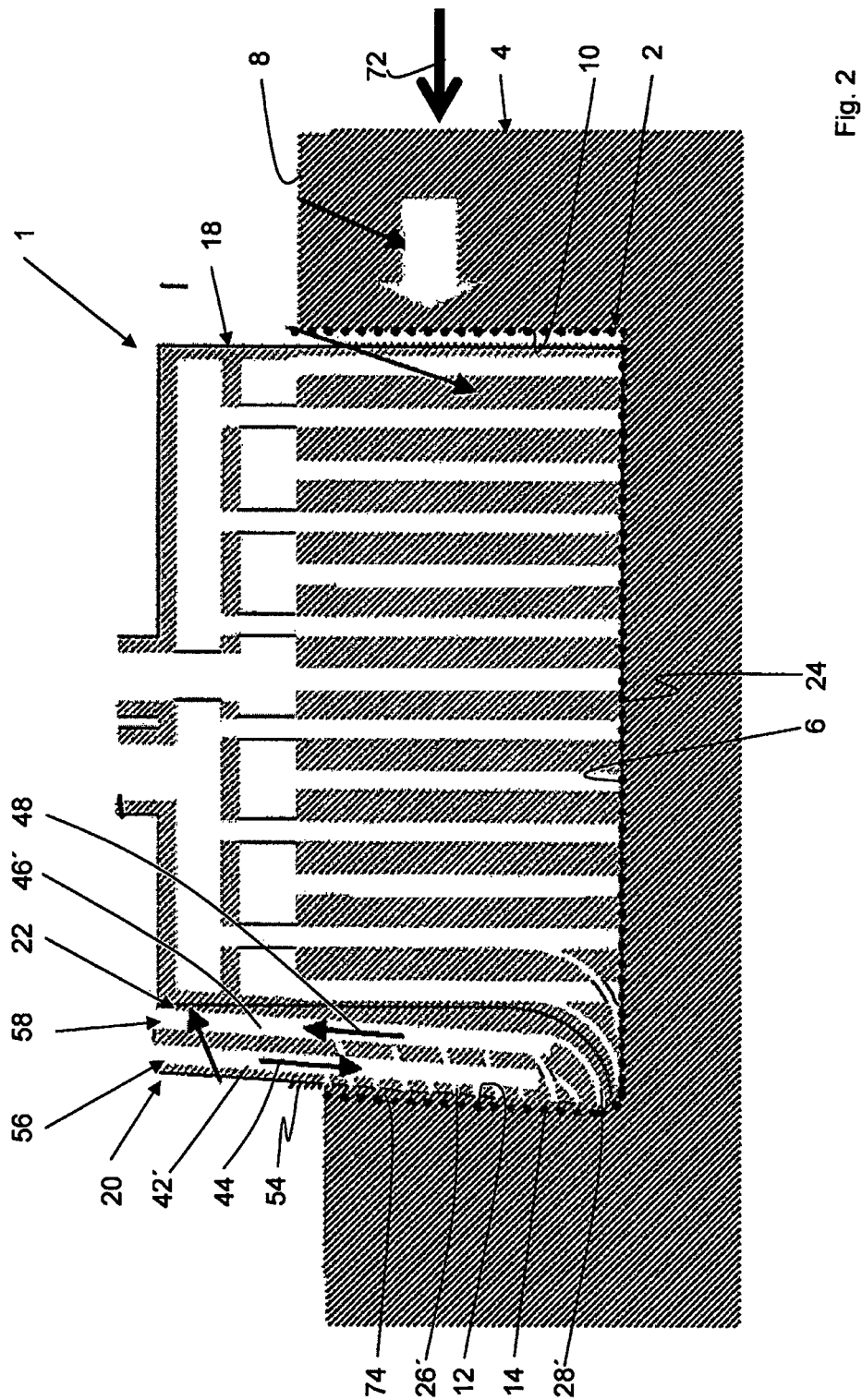
FIG. 2: a second method step for creating the cavity.

Once the bottom surface 6 has been formed, the upright side surface 12 or the undercut 14 of the cavity 2 is formed as shown in FIG. 2. Towards this end, the electrolyte feed means 56 and the electrolyte suctioning means 58 are activated in order to feed the electrolyte to the slanted surface 54 or to subsequently suction it off again, so that now the slanted surface 54 functions as an active surface. The front surface 24 of the base segment 18 remains dry, so that no further material is removed in the area of the bottom surface 6. Then the side segment 18 is energized and the electrode 1 is moved in the crosswise direction 72 as shown in FIG. 2 until sufficient material 74 has been removed and the side surface 12 or the undercut 14 has been formed in accordance with the desired contour. Then the cathode voltage is switched off, the advancing movement in the crosswise direction 72 is halted and the electrolyte flow 56 is interrupted. The electrolyte suctioning means 58 is then only switched off when the upright side surface 14 has dried sufficiently. The electrode is removed from the cavity 2 once the side surface 12 has been formed. The cavity 2 with the bottom surface 6 as well as the side surfaces 10, 12 have now been machined to their desired contour, whereby the suctioning according to the invention prevents an active attack in adjacent areas of the individual active surfaces 24, 54, so that there is no need for subsequent machining, especially in the transition area between the bottom surface 6 and the slanted surfaces 10, 12.

A method is disclosed here for electrochemically machining a workpiece surface 8, 68 with an electrode 1 that has at least one active surface 24, 54 for machining the workpiece surface 8, 68 and with an electrolyte, said method involving the electrolyte being suctioned off the active surface 24, 54, and furthermore, an electrode 1 is disclosed that has at least one electrolyte feed means 34, 56 for feeding the electrolyte to the active surface 24, 54 and an electrolyte suctioning means 36, 58 for suctioning the electrolyte off of the active surface 24, 54.

The invention claimed is:

1. A method for electrochemically machining a workpiece comprising:
   processing a workpiece surface using an electrode having a first active surface and a separate second active surface for processing two workpiece surfaces and using an electrolyte, the first and the second active surfaces having two independently controllable electrolyte feeds and suctions; and
   suctioning the electrolyte off the first and second active surfaces.

2. The method as recited in claim 1 further comprising feeding the electrolyte in at a center of the first active surface, the suctioning off occurring at an edge area of the first active surface.

3. The method as recited in claim 1 wherein the electrolyte passes through the electrode all the way to the first active surface and is then suctioned off the first active surface through the electrode.

4. The method as recited in claim 1 further comprising the following steps:
   a) positioning the electrode across from the workpiece surface to be machined,
   b) switching on an electrolyte circuit comprising a first electrolyte feed and a first electrolyte suction of the electrolyte feeds and suctions in order to define the first active surface,
   c) applying a cathode voltage and moving the electrode in an advancing direction,
   d) machining the workpiece surface to a desired contour,
   e) switching off the cathode voltage, halting the advancing movement and switching off the electrolyte flow,
   f) switching off the first electrolyte suction as soon as the machined workpiece surface is dry, and
   g) repeating steps a) to f) to process further workpiece surfaces until all workpiece surfaces to be machined have been processed, whereby the advancing direction and the active surface change as a function of the workpiece surface and further workpiece surfaces to be machined.

5. The method as recited in claim 1 wherein the electrolyte feeds and the electrolyte suctions comprise a plurality of channels.

6. The method as recited in claim 5 wherein the first active surface has a perforated surface structure in fluid communication with the channels.

7. The method as recited in claim 5 wherein the first active surface has a porous surface structure in fluid communication with the channels.

8. The method as recited in claim 1 wherein a plurality of electrode segments are each provided with the first and second active surfaces.

9. The method as recited in claim 8 further comprising at least one insulating layer electrically insulating the segments from each other.

\* \* \* \* \*